(No Model.)
C. K. LONGENECKER.
STUFFING BOX.
No. 481,406. Patented Aug. 23, 1892.
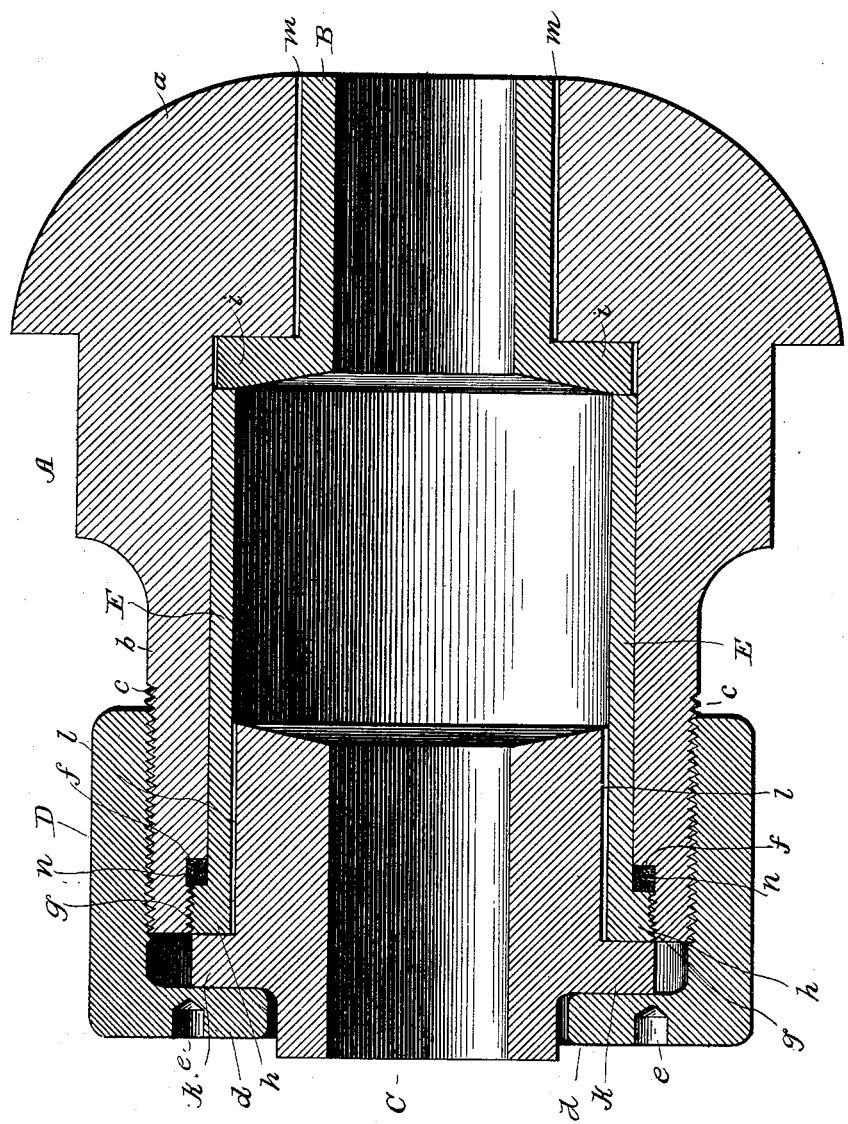
WITNESSES.
Victor J. Evans.
J. F. Beale.
INVENTOR.
Charles K. Longenecker,
by W. A. Redmond, Atty

UNITED STATES PATENT OFFICE.

CHARLES K. LONGENECKER, OF PAINTED POST, NEW YORK, ASSIGNOR TO THE WESTON ENGINE COMPANY, OF SAME PLACE.

STUFFING-BOX.

SPECIFICATION forming part of Letters Patent No. 481,406, dated August 23, 1892.

Application filed April 2, 1892. Serial No. 427,509. (No model.)

*To all whom it may concern:*

Be it known that I, CHARLES K. LONGENECKER, a citizen of the United States, residing at Painted Post, in the county of Steuben and State of New York, have invented certain new and useful Improvements in Stuffing-Boxes for Piston-Rods and the Like; and I do hereby declare the following to be a full, clear, and exact description of the invention, such as will enable others skilled in the art to which it appertains to make and use the same.

This invention relates to stuffing-boxes for piston-rods of steam-engines; and it has for its object to provide a simple, durable box, in which the adjustment of the packing is easily and readily accomplished and in which the gland and bushing are adapted to accommodate themselves to the wear of the crosshead or piston; and it consists, first, in providing means for preventing the longitudinal movement of the gland and bushing during the operation of the piston-rod, and, secondly, in providing a clearance between the gland and bushing and the surrounding parts, whereby said gland and bushing may accommodate themselves to the position of the rod passing therethrough, and in other details of constructions and arrangement of parts, as will be hereinafter fully described and claimed.

In the accompanying drawing, forming a part of this specification, is illustrated a longitudinal vertical sectional view of my improved stuffing-box, the piston-rod and the packing therefor being omitted.

Referring to the drawing, A represents the box proper, one end of which is enlarged and rounded off, as at $a$, the other end and a portion of the body being reduced, as at $b$, for a purpose which will be described. The enlarged end is to be pressed into the engine-bed or the head of the cylinder, as preferred, and made a fixed part or portion thereof. The box is formed with the usual opening at its enlarged end to receive the bushing B, which opening is enlarged in the body of the box, as is also customary, to receive the gland C and the packing for the rod, although in carrying out my invention it is necessary that the last-named opening be of slightly-greater diameter than ordinary. At the reduced end of the box I form the external screw-threads $c$ to receive the internally-screw-threaded adjusting-cap D thereon, said cap being formed with an inwardly-extending flange $d$ and having the recesses $e$ formed therein, whereby a spanner-wrench may be employed to adjust said cap. Within the enlarged opening of the box and at a suitable distance from its end a shoulder $f$ is formed, adjacent which internal screw-threads $g$ are formed, which extend to the extreme end of the box and receive the externally-threaded flange $h$ of a cylindrical sleeve E, said flange being formed on one end of the sleeve and turned outwardly, the diameter of the sleeve being such that it will enter the enlarged opening of the box and accurately fit therein, its opposite end extending to and having a bearing on the flange $i$ of the bushing B. The gland C is formed with a projecting shoulder or flange $k$ at a short distance from its outer end, and said gland is of such diameter that when it is fitted in the sleeve E and there held by the flange $d$ of the cap D the body of the gland stands clear of the sleeve, thus providing a clearance-space, as at $l$, and the bushing B is also of less diameter than the opening therefor in the box and has a clearance-space $m$. The flange of the gland $d$ and the flange $i$ of the bushing have each a clearance-space also, as will be noticed, so that said gland and bushing, owing to the arrangement described, may have a limited movement bodily downward. Any suitable pliable or yielding packing $n$ may be used between the shoulder $f$ of the box and the flange $h$ of the sleeve E to prevent the leakage of steam through the clearance-space surrounding the bushing B and behind the sleeve, should the latter not fit accurately in the box; also, any desired or suitable packing may be used for the piston-rod, the contiguous ends of the gland and bushing being concaved, as is usual, and the packing being arranged between them.

It will be observed from the foregoing description that the sleeve E, being screwed into place, will bear with one end against the flange of the bushing B and hold the same in the position relative to its distance from the walls of the opening it occupies to which it may be adjusted, and that said sleeve will also prevent the longitudinal movement of the bushing should the friction generated by the reciprocation of the piston-rod have a tendency to move the same; but it is not intended that either the gland or the bushing be held rigid as to any movement, except in a longitudinal direction. The flange d of the cap D serves, in connection with the flanged end of sleeve E, to hold the gland C, through its shoulder or flange k, rigid as regards endwise or longitudinal movement during the operation of the engine; but neither the gland nor the bushing is so held that it cannot follow the piston-rod downward or be carried down thereby when the wear of the cross-head or the piston is such that if the gland and bushing could not accommodate themselves to a lower position of cross-head or piston, caused by the wearing away of either or both of the same, the piston-rod would be worn flat on its lower side, owing to the unequal pressure or bearing of the rod on the glands. With the construction and arrangement of parts described the glands will follow or be carried down by the rod as the piston or the cross-head wears away, and thus prevent the rod wearing flat on its lower side. The packing between the gland and bushing may be compressed or adjusted, as desired, by turning the cap D, thus varying the position of the gland C, which is the only part moved during the manipulation of the packing.

Having thus described my invention, what I claim as new, and desire to secure by Letters Patent, is—

1. In a stuffing-box for piston-rods and the like, the combination of a bushing having a flanged end and an adjustable cylindrical sleeve arranged within said box and having one end bearing on the flanged end of said bushing, whereby said bushing is rigidly held against longitudinal movement, substantially as described.

2. In a stuffing-box for piston-rods and the like, the combination of a bushing arranged within and free of the walls of the opening of said box, a cylindrical sleeve for holding said bushing against longitudinal movement, a gland extending into and free of said sleeve, and means for adjusting said gland longitudinally, substantially as described.

3. In a stuffing-box for piston-rods and the like, the combination of a bushing arranged within and with its peripheral surface free of said box, a cylindrical sleeve adjustably secured within the box and having one end bearing against said bushing, a gland extending within and with its peripheral surface free of said sleeve, and an adjustable cap having a flange adapted to bear against said last-named gland, substantially as described.

4. The combination, in a stuffing-box, of a gland and a bushing, each of which is formed with a flange, and an adjustable cylindrical sleeve arranged between and bearing against said flanges, whereby said gland and bushing are rigidly held against longitudinal movement and may be supported out of peripherical contact with said box, substantially as described.

5. The combination, in a stuffing-box for piston-rods and the like formed with an interior shoulder, and internal screw-threads adjacent said shoulder, of a cylindrical sleeve having a screw-threaded flange, pliable or flexible packing arranged between said shoulder and flange, and a bushing arranged within and peripherally free of said box and held against longitudinal movement by said sleeve, substantially as described.

6. The combination, in a stuffing-box for piston-rods and the like formed with external and internal screw-threads at one end, of a sleeve having a screw-threaded flange arranged within, a bushing supported within and peripherally free of said box by said sleeve, a gland arranged within and free of said sleeve, and an internally-screw-threaded cap for adjusting said last-named gland longitudinally, substantially as described.

In testimony whereof I affix my signature in presence of two witnesses.

CHARLES K. LONGENECKER.

Witnesses:
ARTHUR E. IREDELL,
HERBERT L. HOLLISTER.